Dec. 29, 1953  R. MUGFORD  2,664,023
SNAP-ON SPLIT NUT
Filed Nov. 30, 1951
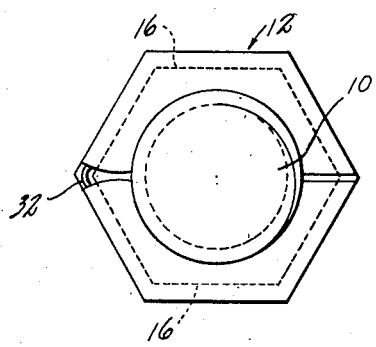
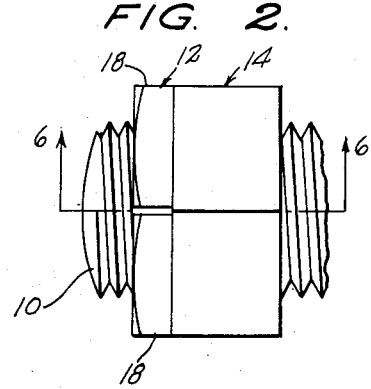
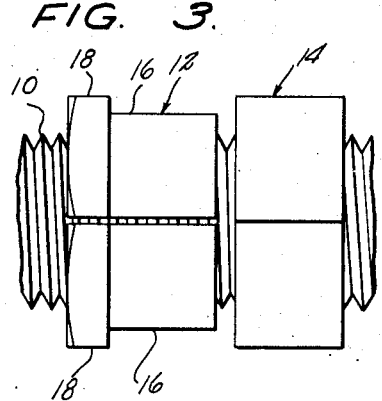
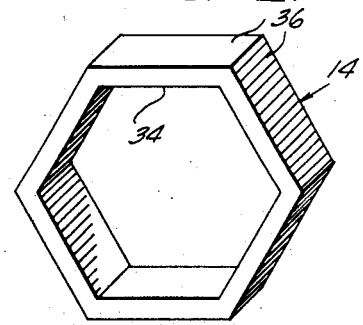
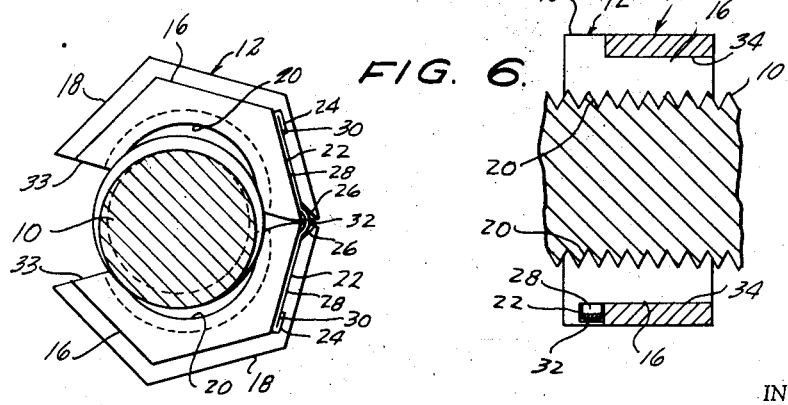
INVENTOR
RONALD MUGFORD,
BY
McMorrow, Berman + Davidson
ATTORNEYS Patented Dec. 29, 1953

2,664,023

UNITED STATES PATENT OFFICE 2,664,023

SNAP-ON SPLIT NUT

Ronald Mugford, Hartford, Conn.

Application November 30, 1951, Serial No. 259,182

2 Claims. (Cl. 85—33)

This invention relates to divided nut constructions, and more particularly has reference to a nut falling within the general category referred to, that is adapted to be snapped onto or off a bolt or screw to which the nut is applied.

Divided or split nuts, which may be applied to or removed from a threaded shank without the necessity of their being threaded the length of the shank, are not new per se, and I am aware of previous nuts falling within this general group. Advantageously, divided or split nuts are usable to meet emergencies such as arise when a nut "freezes" to the threaded shank on which it is mounted. Another instance in which a divided or split nut may be used to advantage is a situation in which space limitations prevent application of the divided or split nut to the end of the threaded shank in the usual manner, preliminary to threading of the nut upon the shank. Still further, a nut of the character described eliminates the inconvenience attendant upon rotation of the nut to shift it to the end of the shank. Rotation of the nut through the use of a wrench or similar tool is, in fact, often impossible due to limitations of space, or is at least difficult to achieve.

Prior divided nut assemblies of which I have knowledge generally include completely separable parts which in some instances must be assembled about the shank by means of pins inserted therethrough or equivalent mechanical devices. It is my belief that while these discharge their intended functions efficiently after assembly about the shank, said assembly is somewhat difficult to achieve, since it may be difficult to align the pins with the pin-receiving openings generally provided, particularly if the shank is in a relatively inaccessible location.

In other divided nut constructions of which I have knowledge, removal of the means used to lock the nut elements about the shank causes said elements to fall away from one another completely, as a result of which they may be lost or may drop into adjacent portions of a machine or similar structure.

The main object of the present invention is to provide a divided nut falling within the category stated which will be novelly designed in a manner to eliminate the deficiencies noted in the prior art construction, and to this end, I have devised a split nut including a pair of half nut elements adapted to extend about and threadedly engage a shank, said half nut elements having confronting ends, one end of the elements being connected by a spring which is tensioned to normally bias the elements away from one another. As a result, the nut elements, when not locked to a threaded shank, open widely at their other ends, for ease in application of the nut to, or removal of the nut from, the shank. A locking sleeve is embodied in the construction, that is adapted to be positioned about the nut elements, so as to lock the elements in threaded engagement with the shank, against the action of the spring, and the sleeve and the nut elements have aligned, polygonal, wrench-receiving outer surfaces so that the entire assembly can be rotated upon the shank as a conventional nut if desired.

A further important object is to provide a divided nut as stated which can be constructed at relatively low cost, and which will comprise a minimum of parts.

Other objects will appear from the following description, the claims appended thereto, and from the annexed drawing, in which like reference characters designate like parts throughout the several views, and wherein:

Figure 1 is an elevational view of the assembled nut as it appears when applied to a threaded shank such as is provided upon a conventional bolt, the nut assembly being viewed facewise;

Figure 2 is an elevational view of the nut assembly viewed edgewise, the shank being illustrated fragmentarily;

Figure 3 is a view similar to Figure 2 in which the nut member and locking sleeve are illustrated as they appear when the sleeve is being applied to or removed from the nut member;

Figure 4 is a perspective view of the locking sleeve;

Figure 5 is a view similar to Figure 1 in which the nut elements are illustrated as they appear when biased away from one another, the shank being shown in transverse section; and Figure 6 is a sectional view taken substantially on line 6—6 of Figure 2.

A threaded shank to which the nut constituting the present invention is applicable has been designated 10, and is intended to represent the shank of any bolt, stud, or machine screw.

The present invention includes a nut member generally designated 12, and a locking sleeve generally designated 14, each of which will be described in turn.

The nut member 12 comprises a pair of complementary half-nut elements adapted to be applied to the threaded shank 10, each half-nut element extending through half the circumference of the shank. Each element is formed with a body 16 having a non-circular outer surface, in the present instance a polygonal surface.

Integral with the body 16, and extending along one edge thereof, is a shoulder 18, which projects radially of the half-nut element, to form a stop shoulder limiting movement of the sleeve 14 upon the nut member in one direction.

The inner surface of each nut element is of arcuate formation, extending through 180° of a circle, and formed with threads 20 complementing the threads of the shank 10.

It will thus be seen that when the nut elements are applied to a threaded shank and are clamped thereupon, they coact to define in the nut member an axial bore having internal threads engaged with said shank.

The shoulder 18 is formed with side walls normal to the axis of said bore, said side walls being provided (see Figure 5) with elongated recesses 22 opening at one end of the nut elements. The inner or closed ends of the recesses are enlarged transversely, as at 24, and the outer or open ends of the recesses are flared or widened as at 26.

The flared ends of the recesses 22 are disposed oppositely of one another, so as to permit an elongated flat spring 28 to be seated in the recess. The spring 28, in this connection, has its opposite ends folded upon themselves and engaged in the transversely enlarged inner ends 24 of the recesses, so as to securely retain the springs within the recesses, and medially between the folded ends, the spring is formed with an offset 32 disposed within the widened outer ends 26 of the recesses.

The spring 22 is tensioned in a manner effective to normally bias the nut elements away from one another, to the position illustrated in Figure 5. When swung away from one another in this manner, the nut elements are so arranged relative to one another as to define a wide space between their other ends 33, through which space the shank 10 may be entered or removed. In this connection, it may be noted that in this position of the ends 33, said ends are disposed at an acute angle to one another, and are positioned chordally of the shank 10. As a result, when the outwardly spread half-nut elements are being applied to the shank, by movement transversely of the shank, they will be cammed outwardly by the surface of the shank, for ease in application of the nut assembly thereto.

Referring now to Figure 4, the locking sleeve 14 is formed with a central opening 34 polygonally formed to complement the polygonal outer surfaces of the half-nut elements. The locking sleeve 14 is also formed with a polygonal outer surface having angularly related facets 36 which, when the locking sleeve is applied to the nut member, are aligned with the polygonal outer surfaces of the respective shoulders 18.

In use, the nut member is applied to the shank in the manner illustrated in Figure 5, after which the locking sleeve 14 is shifted axially of the nut member, so as to surround the bodies of the half-nut elements, the stop shoulders 18 limiting movement of the locking sleeve in one direction. As a result, the half-nut elements are clamped securely about the shank 10 in threaded engagement therewith.

At such time as it may be desired to remove the nut from the shank, the locking sleeve 14 is slipped off the half-nut elements, as a result of which the spring 22 biases the half-nut elements to the opened position thereof illustrated in Figure 5, permitting said elements to be removed easily from the shank in a direction transversely of the shank.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. A nut comprising: a nut member including a pair of half-nut elements having polygonal outer surfaces and arcuate, threaded, confronting inner surfaces coacting to form a threaded bore in which may be engaged a threaded shank to which the nut is applied, said elements having confronting ends; shoulders formed upon and projecting radially from the outer surfaces of the nut elements, said shoulders having side walls arranged normally to the axis of said bore and formed with elongated recesses opening at one end upon one end of the elements, said recesses opening throughout their lengths through said side walls of the shoulders, to form each recess open along one of its sides; a flat spring having its opposite ends seated in said recesses and connecting the elements at said one end thereof, said spring being fully exposed throughout its length through the open sides of the recesses and being tensioned to bias the elements away from each other, so as to spread the other ends thereof apart and thus form a wide space between said other ends through which the shank may be entered and removed; and a locking sleeve having a polygonal opening complementing and receiving the nut elements, said sleeve being shiftable axially of the nut member to surround the elements and hold them assembled about the shank against the action of the spring, said shoulders forming abutments limiting movement of the sleeve axially of the nut member in one direction and said sleeve, when abutted against the shoulders, closing the open sides of the recesses, the shoulders and sleeve having aligned, polygonal outer surfaces proportioned to receive a wrench or like tool.

2. A nut comprising: a nut member including a pair of half-nut elements having polygonal outer surfaces and arcuate, threaded, confronting inner surfaces coacting to form a threaded bore in which may be engaged a threaded shank to which the nut is applied, said elements having confronting ends; shoulders formed upon and projecting radially from the outer surfaces of the nut elements, said shoulders having side walls arranged normally to the axis of said bore and formed with elongated recesses opening at one end upon one end of the elements, said recesses opening throughout their lengths through said side walls of the shoulders, to form each recess open along one of its sides, each recess having, at its other end, an enlarged portion; a flat spring having its opposite end portions seated in said recesses and connecting the elements at said one end of said elements, said spring having folded terminals engaged in said enlarged portions of the recesses, the spring being normally exposed throughout its length through the open sides of the recesses and being tensioned to bias the elements away from each other, so as to spread the other ends of the elements apart and thus form a wide space between said other ends of the elements through which the shank may be entered and removed; and a locking sleeve having a polygonal opening complementing and receiving the nut elements, said sleeve being shiftable axially of the nut member to surround the elements and hold them assembled about the shank against the action of the spring, said shoulders forming abutments limiting movement of the sleeve axially of the nut member in one direction and said sleeve, when abutted against the shoulders, closing the open sides of the recesses, the shoulders and sleeve having aligned, polygonal outer surfaces proportioned to receive a wrench or like tool.

RONALD MUGFORD.

References Cited in the file of this patent

UNITED STATES PATENTS

| Number | Name | Date |
|---|---|---|
| 1,652,169 | Fleming | Dec. 13, 1927 |
| 1,915,588 | Arrington | June 27, 1933 |
| 2,518,469 | Harding | Aug. 15, 1950 |